3,420,621
PROCESS FOR PRODUCING HYDROXYL-AMMONIUM PERCHLORATE
James W. Watters, Washington, D.C., Robert E. Farncomb, Oxon Hill, Md., and Manfred J. Cziesla, Krefeld-Gartenstadt, Germany, assignors to the United States of America as represented by the Secretary of the Navy
No Drawing. Filed Aug. 17, 1966, Ser. No. 573,130
U.S. Cl. 23—85   17 Claims
Int. Cl. C01b *21/14;* C01b *21/18*

ABSTRACT OF THE DISCLOSURE

A process for producing a purified, high yield of hydroxylammonium perchlorate, useful as an oxidizer in propellant formulations, by employing as a reactant hydroxylammonium sulfate or hydroxylammonium chloride.

---

The invention described herein may be manufactured and used by or for the Government of the United States of America for governmental purposes without the payment of any royalties thereon or therefor.

This invention is directed to a chemical synthesis and more particularly to the production of hydroxylammonium perchlorate (HAP).

Hydroxylammonium perchlorate has attracted considerable interest as an oxidizer in propellant formulations because it has more energy and a superior oxygen balance to the conventionally used ammonium perchlorate oxidizer. HAP has been produced by numerous processes including a reaction between hydroxylammonium chloride and barium perchlorate in an alcoholic medium but these processes have several disadvantages including the high cost of starting materials such as barium perchlorate, and the difficulty of removing by-products and impurities without complicated and costly procedures.

Accordingly, it is an object of this invention to provide a new and improved process for producing hydroxylammonium perchlorate.

It is another object of this invention to provide a process that produces hydroxylammonium perchlorate in high yield and quality.

It is a further object of this invention to provide a safe process for producing hydroxylammonium perchlorate.

It is still another object of this invention to provide a process for producing hydroxylammonium perchlorate that can be expanded into a large scale operation.

These and other objects will become more readily apparent from reading the following detailed description of the invention.

The objects of this invention are accomplished, in one aspect, by reacting a solution containing sodium perchlorate and either hydroxylammonium sulfate or hydroxylammonium chloride to produce hydroxylammonium perchlorate and either sodium sulfate or sodium chloride respectively. The reaction is generally run in an alkanol at a low temperature (heating being utilized to dissolve the reactants and increase reaction rate) with methanol being preferred since it is a better solvent for sodium perchlorate and thus permits a lowering of the total reaction volume. Once the sodium perchlorate has been reacted, however, it is best to replace the methanol with an alcohol having from two to five carbon atoms, with butyl alcohol being preferred, since HAP is less soluble in these alcohols, thus making crystallization of the final product easier.

The by-product salts, sodium sulfate and sodium chloride, are insoluble in alkanol while sodium perchlorate and HAP are soluble and thus these by-product salts precipitate from the reaction medium from which they may be removed by conventional separation processes. It has been found, however, that although these by-product salts are insoluble in alkanol, they are partially soluble in alcoholic solutions of HAP, thus preventing the reaction from being driven to completion. In order to solve this problem, the process of this invention, in another aspect, involves precipitating the remaining inorganic salt by-product from solution by the addition of an ether which in combination with the reaction solvent holds HAP in solution while precipitating the inorganic salt by-product. The ethers which are generally employed are the alkyl alkyl ethers, alkyl aryl ethers, and aryl aryl ethers; alkyl alkyl ethers give the best results with isopropyl ether and diethyl ether being preferred due to their low cost and isopropyl ether being the better of the two since it is cheaper, less volatile and less likely to promote condensation of atmospheric moisture.

After removal of the remaining precipitated salt by-product and distillation of the ether, the HAP may be crystallized from the alkanol solvent by concentrating the solution and cooling it to a temperature well below 0° C. This procedure presents several problems, including the difficulty both of separating the product from the highly viscous alcohol and of keeping the product dry. Accordingly, the process of this invention, in another aspect, involves adding either a low boiling (boiling below about 90° C.) petroleum ether or a low boiling halohydrocarbon to the alcoholic solution of HAP in order to both reduce the viscosity of the medium and precipitate HAP from the solution. For this purpose, the chlorinated hydrocarbons are preferred, since they are lower in cost than the other halohydrocarbons and are less flammable and precipitate a final product of higher purity than the petroleum ethers. As representative examples of these chlorohydrocarbons there may be mentioned methylene chloride, perchlorethylene, chloroform, ethylene chloride, and the like, with methylene chloride being preferred for its high volatility and its complete miscibility with the alcoholic solvent. The crystallized HAP may then be removed from the reaction solution by a conventional separation procedure.

The reaction is performed in an alcoholic solution but since hydroxylammonium sulfate is difficultly soluble in alkanols, it must be used in a finely divided condition and kept well stirred. Finely divided hydroxylammonium sulfate may be obtained either by grinding or by dissolution in water followed by precipitation with anhydrous methanol. In performing the reaction, owing to the high acidity of HAP, it is necessary to avoid any contact between any solution of HAP and any metal, including stainless steel, and thus glass or glass-lined reaction vessels, polyethylene, sintered glass or porcelain filters, plastic scoops, spatulas, valves, etc., should be used in handling every solution except the methanolic solution of sodium perchlorate, which may be prepared safely in a stainless steel vessel. In conducting the reaction, owing to the hygroscopic nature of HAP, atmospheric moisture should be excluded, and this is easily accomplished by using closed reaction vessels and placing drying tubes packed with Drierite in every opening through which air is drawn into the system.

The above teachings may be utilized to provide a continuous proces for producing HAP wherein the original reaction media is continuously modified to exploit favorable solubility relations and separate a final product of high purity without the intermediate isolation of a crude final product which must be recrystallized. Thus, a typical procedure would involve reacting, for example, a concentrated methanolic solution of sodium percholate with a concentrated methanolic solution of hydroxylammonium chloride and then diluting the reaction mixture with an alcohol of moderate boiling point, such as isopropyl or n-butyl alcohol. The sodium chloride by-product would then be removed by filtration, the filtrate concentrated by removing methanol under reduced pressure, and a suitable ether such as ethyl or isopropyl ether added to precipitate additional sodium chloride. After removal of the precipitate, the ether would be distilled off under reduced pressure and the HAP precipitated from the solution by addition of a volatile chlorinated solvent such as chloroform or methylene chloride. After the precipitate settles, the supernatant liquid would be removed by either an immersion filter or decantation.

The above procedure for producing HAP may be modified in various ways without departing from the scope of the invention. Thus, for example, ammonium perchlorate may be used as a starting material but since it is considerably less soluble in alcohols than sodium perchlorate, it is generally less satisfactory. The above procedure may also be modified, for example, by neutralizing a solution of either hydroxylammonium chloride or hydroxylammonium sulfate in methanol with sodium hydroxide to produce free hydroxylamine which can be neutralized with perchloric acid to produce HAP. The water introduced with the perchloric acid can be removed as an azeotrope and the HAP can be recovered from the solution as described above. In another modification, the reaction may be conducted in an aqueous solvent which is replaced by an alkanol; e.g., by adding butanol and removing a butanol-water azeotrope, prior to the ether addition. These and other modifications should be readily apparent to those skilled in the art from the above teachings.

The following examples are illustrative of the invention and are not to be construed as limiting it in any manner.

EXAMPLE I

The following is a pilot plant procedure for producing HAP. Sodium perchlorate (56.2 lbs.) was dissolved in anhydrous methanol (131 lbs.), heated to 50–55° C. in a stainless steel reactor and added hot by gravity to a solution of hydroxylammonium chloride (31.2 lbs.) in anhydrous methanol (118 lbs.). The mixture was agitated, heated to 50–55° C. in a glass-lined reactor, cooled, and diluted with n-butanol (50 lbs.). The HAP solution was vacuum filtered from the precipitated sodium chloride by feeding it through a polyethylene immersion filter into a glass-lined still. The sodium chloride which remained in the reactor was discarded after washing with methanol (20 lbs.) and the wash methanol was also filtered into the still. The methanol was distilled at 150–200 mm. and when the vapor temperature characterizing the n-butanol-water azeotrope at the distilling pressure was just exceeded, the still was cooled and air at ambient pressure was admitted through a drying tube. Tertiary butanol (20 lbs.) and isopropyl ether (70 lbs.) were added to the still contents to precipitate additional sodium chloride and the solution was then filtered through a polyethylene immersion filter into a glass-lined vessel. The salt cake in the still was washed twice with methanol (10 lbs.) and discarded, with this wash methanol containing some HAP being used to dissolve hydroxylammonium chloride for the next batch.

The isopropyl ether was distilled from the filtered solution at 150–200 mm., the pressure further reduced and the tertiary butanol distilled at 75–100 mm. The distillation was discontinued as soon as the vapor temperature exceeded that of the n-butanol-water azeotrope and methylene chloride (50 lbs.) was added to the solution at ambient temperature. The precipitated HAP was allowed to settle, the supernatant liquid removed by decantation and the final product washed two or three times with small portions of methylene chloride (7 lbs.). The washing was discontinued when a 25 ml. portion of wash liquid was neutralized to phenolphthalein by 1–2 drops of 1 N sodium hydroxide, indicating that n-butanol was reduced to a level where HAP was no longer dissolved. The HAP was then washed free of methylene chloride with two 5-pint portions of carbon tetrachloride and stored under carbon tetrachloride (20 lbs.).

The final n-butanol-methylene chloride solution separated from the product was distilled at atmospheric pressure; the methylene chloride distillate was reused after drying with calcium chloride and the residual n-butanol, which contains considerable HAP, was used in the next batch.

The yield of HAP is 35–40 lbs. (58–67%) if methanol and n-butanol containing HAP are not recovered and recycled, and 51–54 lbs. (85–90%) if they are.

EXAMPLE II

Finely divided hydroxylammonium sulfate (8.21 g.) is suspended in anhydrous methanol (40 ml.), stirred and 40 ml. of a 0.5 molar solution of sodium hydroxide in anhydrous methanol is added. After fifteen minutes, stirring is discontinued, sodium sulfate settles from the solution, the solution is drawn off through an immersion filter (minimizing exposure to air), and the sodium sulfate is washed with two 10 ml. portions of anhydrous methanol which are added to the main solution, again minimizing exposure to air.

The combined solution is exactly neutralized with 71% perchloric acid to produce HAP; about 8.3 ml. is required to reach the neutral point, between pH 2 and 3, which is determined by a pH meter, taking the point of maximum slope on a plot of the pH of the solution against the volume of acid added.

The HAP solution is diluted with 50 ml. isobutyl alcohol and the methanol and water distilled off under reduced pressure until the vapor temperature characterizing the butanol-water azeotrope at distilling pressure is just exceeded. The solution is then cooled, air at ambient pressure admitted through a drying tube and 30 ml. methylene chloride added to precipitate HAP. The HAP is then washed with methylene chloride as described in Example I.

The use of the teachings of this invention to produce HAP has the following advantages:

(1) Low cost due to the low cost of the raw materials which may be obtained from commercial sources.

(2) Expediency due to the use of standard equipment, mild operating conditions, and the elimination of complicated procedures for excluding moisture.

(3) High yield (usually 85–90% when recovered solvents containing product are recycled) and high purity (above 97% and usually about 99%) of the final product.

(4) Safety due to the use of simple apparatus, mild operating conditions, and the elimination of the necessity to recrystallize crude product from sensitive HAP solutions.

Obviously many modifications and variations of the present invention are possible in the light of the above teachings. It is therefore to be understood, that within the scope of the appended claims, the invention may be practiced otherwise than as specifically described.

What is claimed is:

1. A process for producing hydroxyammonium perchlorate comprising:

(a) reacting a solution containing a perchlorate selected from the group consisting of sodium perchlorate and ammonium perchlorate and a hydroxylammonium compound selected from the group consisting of hydroxylammonium sulfate and hydroxylammonium chloride to produce hydroxylammonium perchlorate, (b) precipitating remaining inorganic salt by-product from the solution by the addition of an ether, said ether being one which in combination with the solution holds hydroxylammonium perchlorate in solution while precipitating inorganic salt by-product and being selected from the group consisting of alkyl alkyl ethers, alkyl aryl ethers and aryl aryl ethers, and (c) recovering hydroxylammonium perchlorate from said solution.

2. The process of claim 1 wherein the reaction is performed in an aqueous solvent which is replaced by an alkanol having from two to five carbon atoms prior to step (b).

3. The process of claim 1 wherein the reaction is performed in an alkanol solvent.

4. The process of claim 3 wherein the perchlorate is sodium perchlorate.

5. The process of claim 4 wherein said ether is an alkyl alkyl ether.

6. The process of claim 5 wherein the hydroxylammonium perchlorate is recovered from solution by the addition of a member selected from the group consisting of low boiling petroleum ethers and low boiling halohydrocarbons.

7. The process of claim 6 wherein said member added to remove the hydroxylammonium perchlorate from solution is a low boiling chlorohydrocarbon.

8. The process of claim 7 wherein the alkanol solvent is methanol.

9. The process of claim 8 wherein the methanol is replaced with an alkanol having from two to five carbon atoms prior to step (b).

10. The process of claim 9 wherein the alkanol replacing the methanol prior to step (b) is a butanol.

11. The process of claim 9 wherein the ether added in step (b) is diisopropyl ether.

12. The process of claim 9 wherein the ether added in step (b) is diethyl ether.

13. The process of claim 11 wherein the chlorohydrocarbon used to recover hydroxylammonium perchlorate from solution is methylene chloride.

14. A process for producing hydroxylammonium perchlorate comprising;
reacting a member selected from the group consisting of hydroxylammonium sulfate and hydroxylammonium chloride with sodium hydroxide in an alkanol solvent and neutralizing the solution with perchloric acid to produce hydroxylammonium perchlorate.

15. The process of claim 14 further comprising recovering hydroxylammonium perchlorate from the solution by the addition of a member selected from the group consisting of low boiling petroleum ethers and low boiling halohydrocarbons.

16. The process of claim 15 wherein the member added to recover hydroxylammonium perchlorate is a chlorohydrocarbon.

17. The process of claim 16 wherein the member added is methylene chloride.

References Cited
UNITED STATES PATENTS

| | | | |
|---|---|---|---|
| 2,322,958 | 6/1943 | Tryon | 23—190 XR |
| 2,377,193 | 5/1945 | Tryon | 23—190 XR |
| 2,739,873 | 3/1956 | Schumacher | 23—85 |
| 2,768,874 | 10/1956 | Robson | 23—85 |
| 3,147,070 | 9/1964 | Rausch | 23—85 XR |
| 3,148,940 | 9/1964 | Groves | 23—190 XR |
| 3,307,903 | 3/1967 | Lazari | 23—85 |
| 3,313,595 | 4/1967 | Jockers et al. | 23—190 XR |

OTHER REFERENCES

Chem. Abstracts, vol. 54, No. 4, Feb. 25, 1960, page 3883.

EARL C. THOMAS, *Primary Examiner.*

EDWARD STERN, *Assistant Examiner.*

U.S. Cl. X.R.

23—190, 356